(12) United States Patent
Hwang et al.

(10) Patent No.: US 8,934,077 B2
(45) Date of Patent: Jan. 13, 2015

(54) CHOLESTERIC LIQUID CRYSTAL DISPLAY DEVICE AND METHOD FOR MANUFACTURING THE SAME

(75) Inventors: Hyun Ha Hwang, Seoul (KR); Seung Gon Kang, Hwaseong-si (KR); Heon Kyu Kim, Suwon-si (KR)

(73) Assignee: Intellectual Discovery Co., Ltd., Seoul (KR)

( * ) Notice: Subject to any disclaimer, the term of this patent is extended or adjusted under 35 U.S.C. 154(b) by 236 days.

(21) Appl. No.: 13/459,733

(22) Filed: Apr. 30, 2012

(65) Prior Publication Data

US 2012/0274887 A1 Nov. 1, 2012

(30) Foreign Application Priority Data

Apr. 29, 2011 (KR) ........................ 10-2011-0040564

(51) Int. Cl.
*C09K 19/02* (2006.01)
*G02F 1/1347* (2006.01)
*G02F 1/137* (2006.01)

(52) U.S. Cl.
CPC ........ *G02F 1/13473* (2013.01); *G02F 1/13718* (2013.01); *G02F 2001/13478* (2013.01); *G02F 2201/343* (2013.01); *G02F 2202/28* (2013.01)
USPC .......................................... 349/185; 349/115

(58) Field of Classification Search
USPC .................................................. 349/115, 185
See application file for complete search history.

(56) References Cited

U.S. PATENT DOCUMENTS

| 7,484,876 B2 * | 2/2009 | Kim et al. ..................... 362/616 |
| 7,796,103 B2 | 9/2010 | Doane et al. |
| 2001/0004108 A1 * | 6/2001 | Iwamatsu et al. .......... 252/299.7 |

FOREIGN PATENT DOCUMENTS

| JP | 2001-033769 | 2/2001 |
| JP | 2002-014351 | 1/2002 |
| JP | 2002-244106 | 8/2002 |
| JP | 2010-224423 | 10/2010 |
| JP | 2011-043777 | 3/2011 |
| KR | 1020060041444 | 5/2006 |

OTHER PUBLICATIONS

International Search Report for International Application No. PCT/KR2012/003064 mailed on Nov. 7, 2012.

\* cited by examiner

*Primary Examiner* — Lucy Chien
(74) *Attorney, Agent, or Firm* — Amin, Turocy & Watson, LLP

(57) ABSTRACT

There is provided a cholesteric liquid crystal display device including a first liquid crystal panel containing a first cholesteric liquid crystal substancecrystal material for reflecting a light of a first color, a second liquid crystal panel containing a second cholesteric liquid crystal substancecrystal material for reflecting a light of a second color, a third liquid crystal panel containing a third cholesteric liquid crystal substancecrystal material for reflecting a light of a third color, a light absorption layer combined to a lower portion of the third liquid crystal panel, a first double-sided adhesive buffer layer configured to combine the second liquid crystal panel to a lower portion of the first liquid crystal panel and a second double-sided adhesive buffer layer configured to combine the third liquid crystal panel to a lower portion of the second liquid crystal panel.

16 Claims, 5 Drawing Sheets though material for reflecting a light of a first color, a second liquid crystal panel containing a second cholesteric liquid crystal substancecrystal material for reflecting a light of a second color, a third liquid crystal panel containing a third cholesteric liquid crystal substancecrystal material for reflecting a light of a third color, a light absorption layer combined to a lower portion of the third liquid crystal panel, a first double-sided adhesive buffer layer positioned between the first liquid crystal panel and the second liquid crystal panel to combine the second liquid crystal panel to a lower portion of the first liquid crystal panel and a second double-sided adhesive buffer layer positioned between the second liquid crystal panel and the third liquid crystal panel to combine the third liquid crystal panel to a lower portion of the second liquid crystal panel.

CHOLESTERIC LIQUID CRYSTAL DISPLAY DEVICE AND METHOD FOR MANUFACTURING THE SAME

CROSS-REFERENCE TO RELATED APPLICATION

This application claims the benefit of Korean Patent Application No. 10-2011-0040564 on Apr. 29, 2011, the entire disclosure of which is incorporated herein by reference.

TECHNICAL FIELD

The present disclosure relates to a cholesteric liquid crystal display device and a method for manufacturing the same, in particular, a cholesteric liquid crystal display device and a method for manufacturing the same, which are capable of minimizing the stress between neighbored panels in a cholesteric liquid display device having a stacking structure.

BACKGROUND

A cholesteric liquid crystal display device has a plannar texture reflecting an external light or a focal conic texture absorbing an external light, depending on an electric field to be applied. Even if an electric field is not maintained in a specific texture, the cholesteric liquid crystal display device can maintain the corresponding texture. Thus, the cholesteric liquid crystal display device has bistability. Based on the bistability, the cholesteric liquid crystal display device has been utilized as an e-paper display.

The cholesteric liquid crystal display device is capable of displaying colors depending on pitches of molecules contained in a liquid crystal layer and a wavelength of an incident light. With respect to the display of colors in the cholesteric liquid crystal display device, a related art (U.S. Pat. No. 7,796,103; "Drapable Liquid Crystal Transfer Display Film") describes a structure of stacking a multiple number of liquid crystal layers displaying different colors.

However, the conventional cholesteric liquid crystal display device having the stacking structure uses a transparent adhesive such as OCA between liquid crystal panels in order to simply fix the two panels.

Accordingly, when the liquid crystal display device is bent or crooked, the stress acting on the liquid crystal panels and the transparent adhesive is not dispersed and is concentrated to one direction. As a result, the liquid crystal display device cannot be easily bent or crooked.

In case of stacking three or more liquid crystal panels, the liquid crystal panels should be individually manufactured, and then, arranged and stacked in correspondence with their respective pixels. Thus, the manufacturing process becomes complicated.

SUMMARY

In order to solve the above-described problems, the present disclosure provides a cholesteric liquid crystal display device capable of minimizing the stress between neighboring panels when the liquid crystal display device is bent or crooked.

Also, the present disclosure provides a cholesteric liquid crystal display device capable of displaying colors with a simple structure.

Also, the present disclosure provides a method for manufacturing the cholesteric liquid crystal display device.

In accordance with a first aspect of the illustrative embodiments, there is provided a cholesteric liquid crystal display device including a first liquid crystal panel containing a first cholesteric liquid crystal substancecrystal material for reflecting a light of a first color, a second liquid crystal panel containing a second cholesteric liquid crystal substancecrystal material for reflecting a light of a second color, a third liquid crystal panel containing a third cholesteric liquid crystal substancecrystal material for reflecting a light of a third color, a light absorption layer combined to a lower portion of the third liquid crystal panel, a first double-sided adhesive buffer layer positioned between the first liquid crystal panel and the second liquid crystal panel to combine the second liquid crystal panel to a lower portion of the first liquid crystal panel and a second double-sided adhesive buffer layer positioned between the second liquid crystal panel and the third liquid crystal panel to combine the third liquid crystal panel to a lower portion of the second liquid crystal panel.

In accordance with a second aspect of the illustrative embodiments, there is provided a reflective liquid crystal display device including a plurality of liquid crystal panels containing a liquid crystal substancecrystal material for reflecting a light, at least one double-sided adhesive, buffer layer positioned among the plurality of liquid crystal panels and comprising a film, a first adhesive layer positioned on a top surface of the film, and a second adhesive layer positioned on a lower surface of the film, and a light absorption layer combined to a lower portion of a liquid crystal panel positioned undermost among the plurality of liquid crystal panels, wherein the plurality of liquid crystal panels comprise liquid crystal material s for reflecting lights of different colors respectively, and the liquid crystal substancecrystal material reflects a light when the liquid crystal substancecrystal material has a plannar texture and allows a light to penetrate therethrough when the liquid crystal substancecrystal material has a focal conic texture.

In accordance with a third aspect of the illustrative embodiments, there is provided a method for manufacturing a cholesteric liquid crystal display device, the method including (a) inserting a first double-sided adhesive buffer layer between a first liquid crystal panel containing a first cholesteric liquid crystal substancecrystal material for reflecting a light of a first color and a second liquid crystal panel containing a second cholesteric liquid crystal substancecrystal material for reflecting a light of a second color to combine the second liquid crystal panel to a lower portion of the first liquid crystal panel, and (b) inserting a second double-sided adhesive buffer layer between the second liquid crystal panel and a third liquid crystal panel containing a third cholesteric liquid crystal substancecrystal material for reflecting a light of a third color to combine the third liquid crystal panel to a lower portion of the second liquid crystal panel.

In accordance with the above-described technical means of the present disclosure to solve the conventional technical problems, when the cholesteric liquid crystal display device having the stacking structure is bent or crooked, the stress between the neighboring panels is minimized, so that the cholesteric liquid crystal display device can be easily bent or crooked.

By providing the cholesteric liquid crystal display device having the simple structure of combining two panels, the manufacturing process can be simplified, and the stability of the whole structure can be improved.

BRIEF DESCRIPTION OF THE DRAWINGS

Non-limiting and non-exhaustive embodiments will be described in conjunction with the accompanying drawings. Understanding that these drawings depict only several embodiments in accordance with the disclosure and are, therefore, not to be intended to limit its scope, the disclosure will be described with specificity and detail through use of the accompanying drawings, in which.

DETAILED DESCRIPTION

Figure 1:
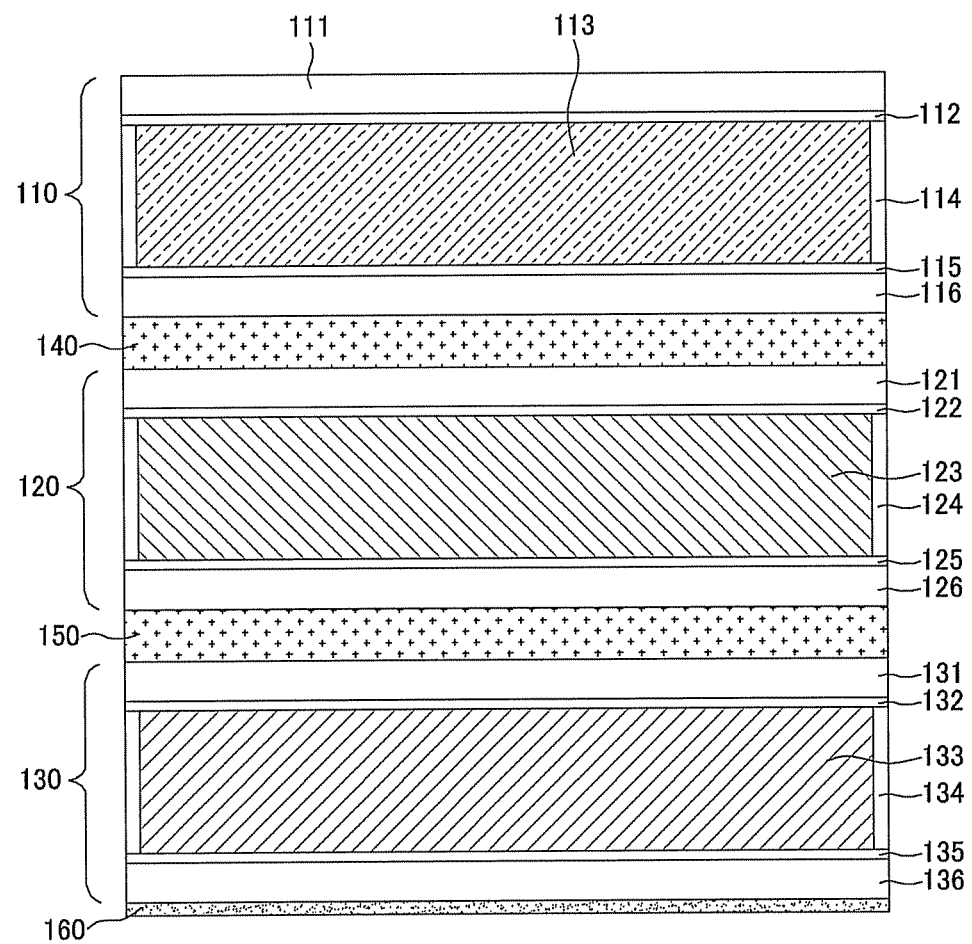
FIG. 1 is a cross sectional view showing a structure of a cholesteric liquid crystal display device in accordance with an illustrative embodiment.

Hereinafter, illustrative embodiments will be described in detail with reference to the accompanying drawings so that inventive concept may be readily implemented by those skilled in the art. However, it is to be noted that the present disclosure is not limited to the illustrative embodiments but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" include both a case where an element is "directly connected or coupled to" another element and a case where an element is "electronically connected or coupled to" another element via still another element. Further, the term "comprises or includes" and/or "comprising or including" used in the document means that one or more other components, processes, operation and/or existence or addition of elements are not excluded in addition to the described components, processes, operation and/or elements.

FIG. 1 is a cross sectional view showing a structure of a cholesteric liquid crystal display device in accordance with an illustrative embodiment.

As illustrated in FIG. 1, a cholesteric liquid crystal display device 10 in accordance with an illustrative embodiment may include a first liquid crystal panel 110, a second liquid crystal panel 120, a third liquid crystal panel 130, a first double-sided adhesive buffer layer 140, a second double-sided adhesive buffer layer 150, and a light absorption layer 160.

The first liquid crystal panel 110 may include a first cholesteric liquid crystal material 113 for reflecting a light of a first color. The second liquid crystal panel 120 may include a second cholesteric liquid crystal material 123 for reflecting a light of a second color. The third liquid crystal panel 130 may include a third cholesteric liquid crystal material 133 for reflecting a light of a third color.

The first liquid crystal panel 110 may include an upper substrate 111, a lower substrate 116, an upper electrode 112 combined to the upper substrate 111, a lower electrode 115 combined to the lower substrate 116, the first cholesteric liquid crystal material 113 filled between the upper electrode 112 and the lower electrode 115, and a partition wall 114 sealing the first cholesteric liquid crystal material 113.

The second liquid crystal panel 120 may include an upper substrate 121, a lower substrate 126, an upper electrode combined to the upper substrate 121, a lower electrode 125 combined to the lower substrate 126, the second cholesteric liquid crystal material 123 filled between the upper electrode 122 and the lower electrode 125, and a partition wall 124 sealing the second cholesteric liquid crystal material 123.

The third liquid crystal panel 130 may include an upper substrate 131, a lower substrate 136, an upper electrode 132 combined to the upper substrate 131, a lower electrode 135 combined to the lower substrate 136, the third cholesteric liquid crystal material 133 filled between the upper electrode 132 and the lower electrode 135, and a partition wall 134 sealing the third cholesteric liquid crystal material 133.

Each of the substrates and the electrodes included in the first liquid crystal panel 110, the second liquid crystal panel 120, and the third liquid crystal panel 130 is formed of a transparent material enabling penetration of a light.

The upper electrode and the lower electrode are in an array form.

Figure 2:
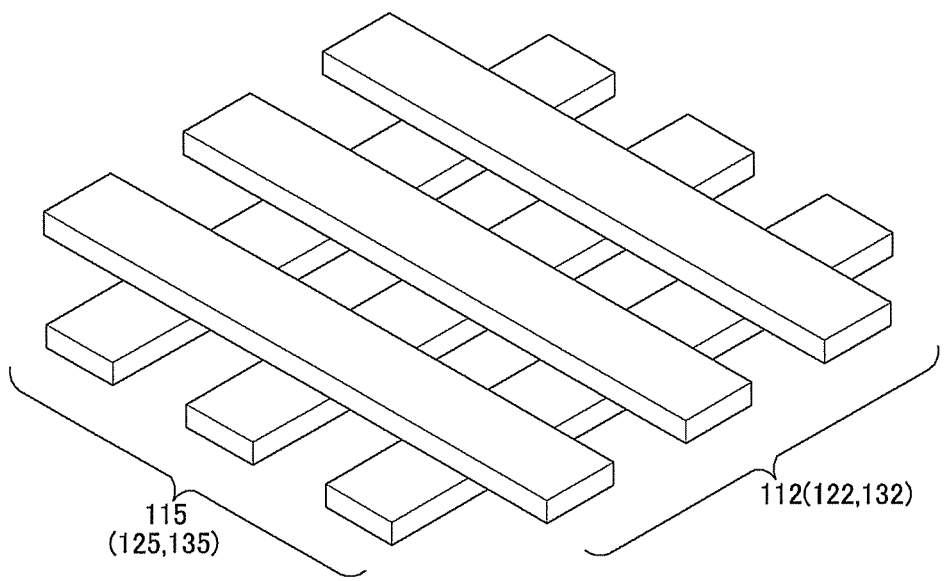
FIG. 2 illustrates a structure of an electrode included in a liquid crystal panel in accordance with an illustrative embodiment.

FIG. 2 illustrates a structure of an electrode included in a liquid crystal panel in accordance with an illustrative embodiment.

As illustrated in FIG. 2, the upper electrode 112 and the lower electrode 115 include a multiple number of separated electrode lines. The upper electrode 112 and the lower electrode 115 are spaced from each other with at least a certain distance and arranged facing to each other. A direction, to which the upper electrode 112 extends, and a direction, to which the lower electrode 115 extends, cross with each other.

The structure of the electrodes may be identically applied to the first liquid crystal panel 110, the second liquid crystal panel 120, and the third liquid crystal panel 130.

Returning to FIG. 1, in response to an incident light, the first cholesteric liquid crystal material 113 may reflect a light of a first color. The second cholesteric liquid crystal material 123 may reflect a light of a second color. The third cholesteric liquid crystal material 133 may reflect a light of a third color.

The first to third colors are different from one another. For example, each of the first to third colors may be one of red (R), green (G), and blue (B) or one of cyan (C), magenta (M), and yellow (Y). However, the first to third colors are not limited thereto.

The first cholesteric liquid crystal material 113 to the third cholesteric liquid crystal material 133 have the plannar texture or the focal conic texture depending on an electric field to be applied by the upper electrodes 112, 122, 132 and the lower electrodes 115, 125, 135. When the liquid crystal materials have the plannar texture, the liquid crystal materials reflect a light. When the liquid crystal materials have the focal conic texture, the liquid crystal materials allow a light to penetrate therethrough.

A first double-sided adhesive buffer layer 140 is positioned between the first liquid crystal panel 110 and the second liquid crystal panel 120, so that the second liquid crystal panel 120 can be combined to a lower portion of the first liquid crystal panel 110.

A second double-sided adhesive buffer layer 150 is positioned between the second liquid crystal panel 120 and the third liquid crystal panel 130, so that the third liquid crystal panel 130 can be combined to a lower portion of the second liquid crystal panel 120.

Figure 3:
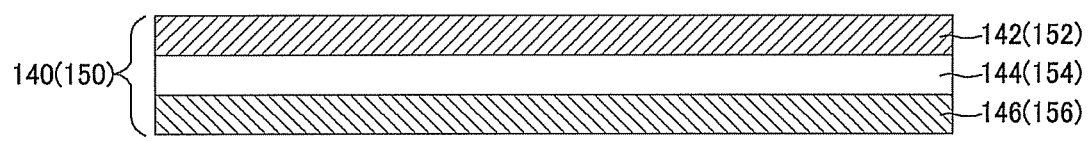
FIG. 3 is a cross sectional view showing a structure of a double-sided adhesive buffer layer included in a cholesteric liquid crystal display device in accordance with an illustrative embodiment.

FIG. 3 is a cross sectional view showing a structure of a double-sided adhesive buffer layer included in a cholesteric liquid crystal display device in accordance with an illustrative embodiment.

As illustrated in FIG. 3, the first double-sided adhesive buffer layer 140 may have a structure of stacking a first adhesive layer 142, a film 144, and a second adhesive layer 146.

The first adhesive layer 142 is positioned on a top surface of the film 144 and may be adhered to the lower substrate 116 of the first liquid crystal panel 110 positioned on a top portion of the first double-sided adhesive buffer layer 140.

The second adhesive layer 146 is positioned on a lower surface of the film 144 and may be adhered to the upper substrate 121 of the second liquid crystal panel 120 positioned on a lower portion of the first double-sided adhesive buffer layer 140.

The first adhesive layer 142 and the second adhesive layer 146 may be formed of an adhesive generally used in the technical field of the present disclosure, e.g., an acrylic adhesive or a silicon (Si) adhesive.

The film 144 may be formed of a material including PET, PEN, tri acetyl cellulose (TAC), PES, PAR, or RC.

The structure and the material for the double-sided adhesive buffer layer may be commonly used in the second double-sided adhesive buffer layer 150.

The first double-sided adhesive buffer layer 140 and the second double-sided adhesive buffer layer 150 may have a transparent property in whole visible ray wavelength areas.

Also, the first double-sided adhesive buffer layer 140 and the second double-sided adhesive buffer layer 150 may have a refractive index in a range identical or similar to a refractive index of the substrates 111, 116, 121, 126, 131, and 136 included in the first liquid crystal panel 110, the second liquid crystal panel 120, and the third liquid crystal panel 130. For example, the first adhesive layer 142 and the second adhesive layer 146 of the first double-sided adhesive buffer layer 140, and the first adhesive layer 152 and the second adhesive layer 156 of the second double-sided adhesive buffer layer 150 may have a refractive index in a range identical or similar to a refractive index of the substrates 111, 116, 121, 126, 131, 136 included in the first liquid crystal panel 110, the second liquid crystal panel 120, and the third liquid crystal panel 130. The first double-sided adhesive buffer layer 140 and the second double-sided adhesive buffer layer 150 have a refractive index in a range identical or similar to a refractive index of the substrates in the liquid crystal panels, so that reflection of a light resulting from a difference in a refractive index on boundary surfaces between the double-sided adhesive buffer layers and the substrates of the liquid crystal panels can be minimized.

The first adhesive layer 142, 152 and the second adhesive layer 146, 156 may have different adhesions. With the different adhesions of the first adhesive layer 142, 152 and the second adhesive layer 146, 156 of the double-sided adhesive buffer layer 140, 150, a difference in the stress resulting from a difference in a bending radius can be effectively compensated.

The light absorption layer 160 may be combined to a lower portion of the third liquid crystal panel 130. The light absorption layer 160 may absorb a light that have passed through the first liquid crystal panel 110, the second liquid crystal panel 120, and the third liquid crystal panel 130. As a result of the absorption of a light, a black color is displayed.

The display of a color in the cholesteric liquid crystal display device can be implemented as described below.

For example, it is assumed that the first cholesteric liquid crystal material 113 reflects a green color, the second cholesteric liquid crystal material 123 reflects a blue color, and the third cholesteric liquid crystal material 133 reflects a red color.

In order to display the green color, an electric field is applied such that the first cholesteric liquid crystal material 113 has the plannar texture. And, an electric field is applied such that the second cholesteric liquid crystal material 123 and the third cholesteric liquid crystal material 133 have the focal conic texture. In this way, in the incident visible ray, only a light of a wavelength for display of the green color is reflected outwardly. Lights of the other wavelengths are absorbed by the light absorption layer 160.

Likewise, in order to display the blue color, an electric field is applied such that the second cholesteric liquid crystal material 123 has the planner texture. And, an electric field is applied such that the other cholesteric liquid crystal materials have the focal conic texture. In order to display the red color, an electric field is applied such that the third cholesteric liquid crystal material 133 has the plannar texture. And, an electric field is applied such that the other cholesteric liquid crystal materials 133 have the focal conic texture. In order to display a white color, all the cholesteric liquid crystal materials should have the plannar texture. In order to display a black color, all the cholesteric liquid crystal materials should have the focal conic texture.

Figure 4:
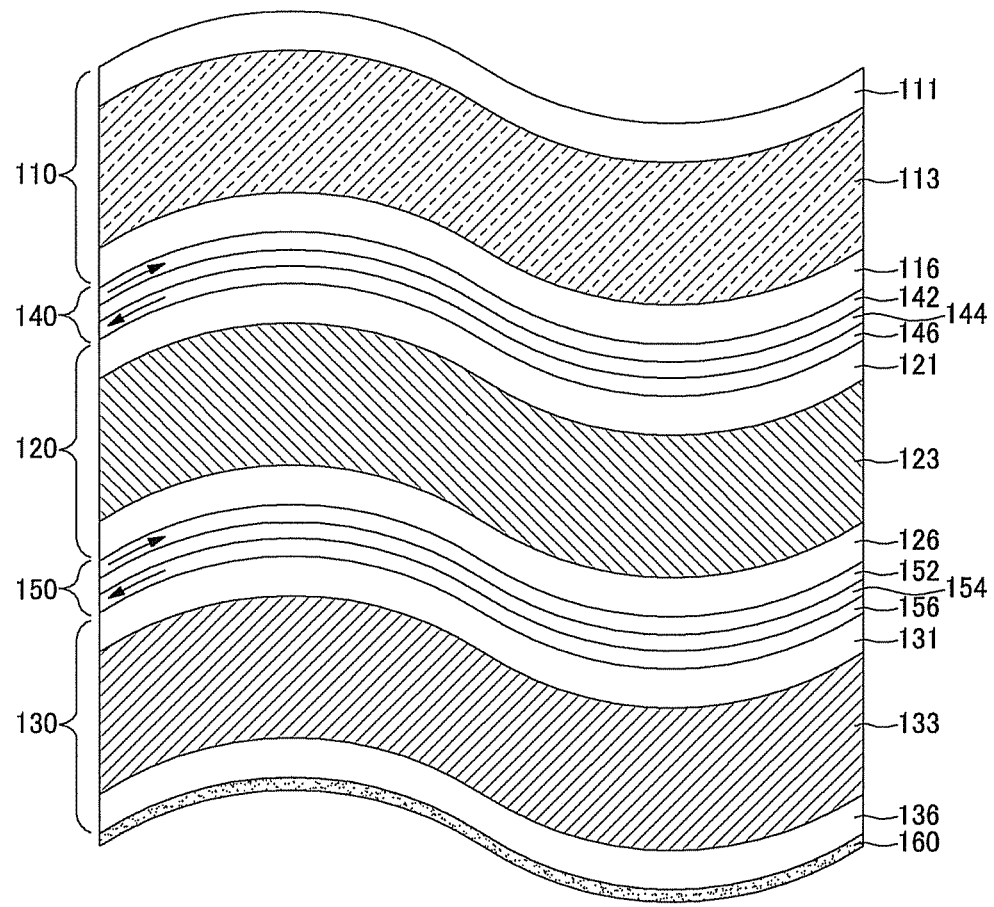
FIG. 4 is a cross sectional view showing a structure of a cholesteric liquid crystal display device when a force is applied to the cholesteric liquid crystal display device in accordance with an illustrative embodiment.

FIG. 4 is a cross sectional view showing a structure of a cholesteric liquid crystal display device when a force is applied to the cholesteric liquid crystal display device in accordance with an illustrative embodiment.

The cholesteric liquid crystal display device 10 illustrated in FIG. 4 has the same structure as illustrated in FIG. 1. However, for simplification of the drawings, FIG. 4 does not illustrate the electrodes 112, 115, 122, 125, 132, 135.

As illustrated in FIG. 4, when a force is applied to the cholesteric liquid crystal display device 10, the cholesteric liquid crystal display device 10 may be in the bent state. When the cholesteric liquid crystal display device 10 is in the bent state, the stress may act on each of the liquid crystal panels 110, 120, 130 in the arrow direction of FIG. 4. When the cholesteric liquid crystal display device 10 is in the bent state, there is the tendency that a bending radius is small at a center of the bent portion and large apart from the center of the bent portion. The difference in the bending radius may result in a difference in a direction, toward which the stress is generated. For example, if the bending radius is small at the center of the bent portion, more stress is generated outwardly. If the bending radius is large at the center of the bent portion, more stress is generated inwardly.

In the cholesteric liquid crystal display device 10 in accordance with an illustrative embodiment, the first double-sided adhesive buffer layer 140 is inserted between the first liquid crystal panel 110 and the second liquid crystal panel 120. The second double-sided adhesive buffer layer 150 is inserted between the second liquid crystal panel 120 and the third liquid crystal panel 130. The two neighbored liquid crystal panels are adhered to each other by the double-sided adhesive buffer layer inserted therebetween. Accordingly, when the cholesteric liquid crystal display device 10 is bent or crooked, the stress acting on the liquid crystal panels can be effectively dispersed. Accordingly, satisfactory flexibility of the cholesteric liquid crystal display device 10 can be achieved.

By differentiating the adhesions of the first adhesive layer 142, 152 and the second adhesive layer 146, 156 of the double-sided adhesive buffer layer 140, 150, the difference in the stress resulting from the difference in the bending radius can be effectively compensated. For example, an adhesive layer in contact with entirety or part of a liquid crystal panel exhibiting a tendency of a large bending radius may have a relatively small adhesion. An adhesive layer in contact with entirety or part of a liquid crystal panel exhibiting a tendency of a small bending radius may have a relatively stronger adhesion.

The cholesteric liquid crystal display device 10 in accordance with the illustrative embodiment has been described. However, the above-described structure may be applied to a different reflection type liquid crystal display device.

Figure 5:
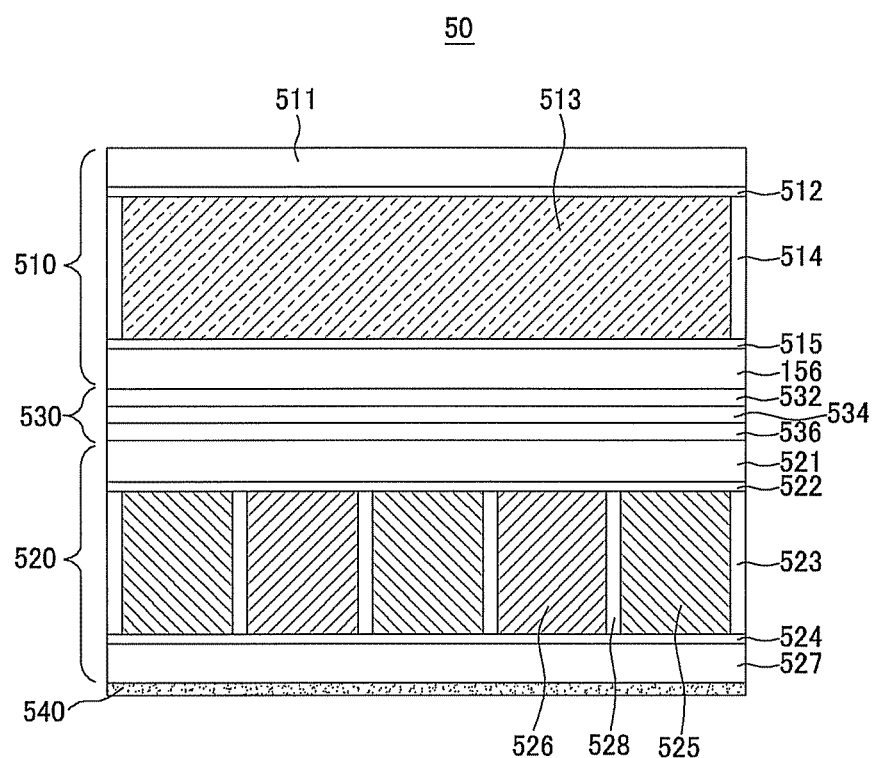
FIG. 5 is a cross sectional view showing a structure of a cholesteric liquid crystal display device in accordance with another illustrative embodiment.

FIG. 5 is a cross section view showing a structure of a cholesteric liquid crystal display device in accordance with another illustrative embodiment.

As illustrated in FIG. 5, a cholesteric liquid crystal display device 50 in accordance with another illustrative embodiment may include a first liquid crystal panel 510 containing a first cholesteric liquid crystal material 513 for reflecting a light of a first color, a second liquid crystal panel 520 containing a second cholesteric liquid crystal material 525 for reflecting a light of a second color and a third cholesteric liquid crystal material 526 for reflecting a light of a third color, a double-sided adhesive buffer layer 530 positioned between the first liquid crystal panel 510 and the second liquid crystal panel 520 to combine the second liquid crystal panel 520 to a lower portion of the first liquid crystal panel 510, and a light absorption layer combined to a lower portion of the second liquid crystal panel 520 to absorb a light.

The first liquid crystal panel 510 may include an upper substrate 511, a lower substrate 516, an upper electrode 512 combined to the upper substrate 511, a lower electrode 515 combined to the lower substrate 516, a first cholesteric liquid crystal material 513 filled between the upper electrode 512 and the lower electrode 516, and a partition wall 514 sealing the first cholesteric liquid crystal material 513.

The second liquid crystal panel 520 may include an upper substrate 521, a lower substrate 527, an upper electrode 522 combined to the upper substrate 512, and a lower electrode 524 combined to the lower substrate 527, a second cholesteric liquid crystal material 525 and a third cholesteric liquid crystal material 526, which are filled between the upper electrode 522 and the lower electrode 524, a partition wall 523 sealing the liquid crystal materials, and a partition wall 528 for partitioning the second cholesteric liquid crystal material 525 and the third cholesteric liquid crystal material 526.

Each of the substrates and the electrodes included in the first liquid crystal panel 510 and the second liquid crystal panel 520 is formed of a transparent material enabling penetration of a light.

The upper electrode and the lower electrode included in the cholesteric liquid crystal display device 50 may be in an array form, like the upper electrode and lower electrode included in the aforementioned cholesteric liquid crystal display device 10 in accordance with an illustrative embodiment.

Properties and colors of reflected lights of the first to third cholesteric liquid crystal materials 513, 525, 526 included in the cholesteric liquid crystal display device 50 are identical to those in the aforementioned cholesteric liquid crystal display device 10 in accordance with an illustrative embodiment.

The cholesteric liquid crystal display device in accordance with another illustrative embodiment has a simple structure enabling display of three or more colors and combining only two liquid crystal panels. Thus, the process for manufacturing the cholesteric liquid crystal display device, can be simplified. Furthermore, by reducing the number of layers to be stacked, the stability of the whole structure can be improved.

A double-sided adhesive buffer layer 530 is positioned between the first liquid crystal panel 510 and the second liquid crystal panel 520, so that the second liquid crystal panel 520 can be combined to a lower portion of the first liquid crystal panel 510. The combination of the second liquid crystal panel 520 to the lower portion of the first liquid crystal panel 510 has been described. However, the order of stacking the panels may be changed, so that the first liquid crystal panel 510 can be combined to a lower portion of the second liquid crystal panel 520.

The double-sided buffer layer 530 may be formed in a structure of stacking a first adhesive layer 532, a film 534, and a second adhesive layer 536. The specific structure and properties of the double-sided adhesive buffer layer 530 are identical to those of the first double-sided adhesive buffer layer 140 or the second double-sided adhesive buffer layer 150 of the aforementioned cholesteric liquid crystal display device 10 in accordance with an illustrative embodiment. Accordingly, detailed descriptions thereof are omitted herein.

In the cholesteric liquid crystal display device 50 in accordance with another illustrative embodiment, the double-sided adhesive buffer layer 530 is inserted between the first liquid crystal panel 510 and the second liquid crystal panel 520. The two neighbored liquid crystal panels are adhered to each other by the double-sided buffer layer inserted therebetween. Accordingly, when the cholesteric liquid crystal display device 50 is bent or crooked, the stress acting on the liquid crystal panels can be effectively dispersed. Accordingly, satisfactory flexibility of the cholesteric liquid crystal display device 50 can be achieved.

Figure 6:
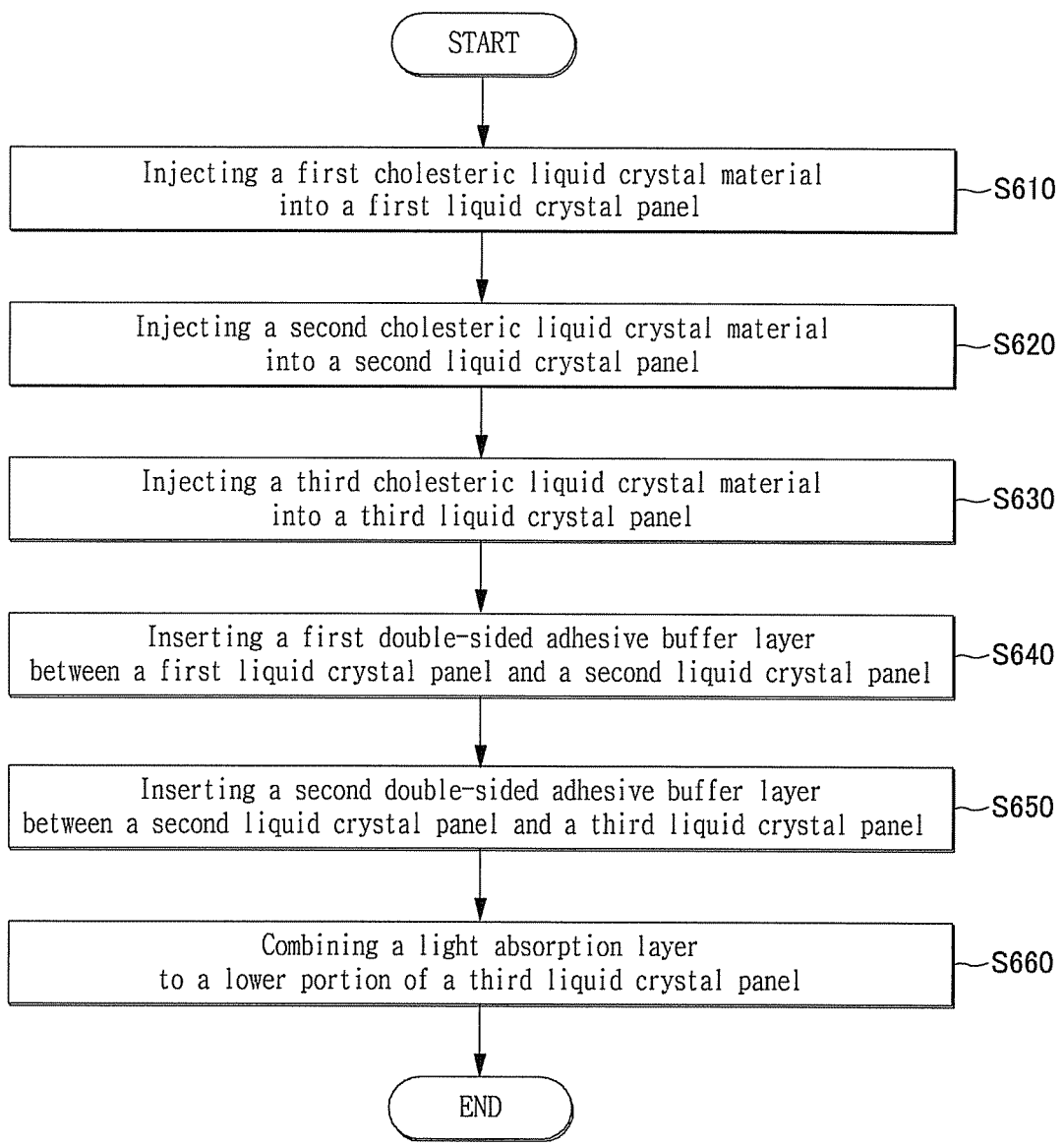
FIG. 6 is a sequence view showing a method for manufacturing a cholesteric liquid crystal display device in accordance with an illustrative embodiment.

FIG. 6 is a sequence view showing a method for manufacturing a cholesteric liquid crystal display device in accordance with an illustrative embodiment.

First, the first cholesteric liquid crystal material 113 for reflecting the light of the first color is injected (S610). In this case, the first liquid crystal panel 110 includes the upper substrate 111, the lower substrate 116, the upper electrode 112 combined to the upper substrate 111, and the lower electrode 115 combined to the lower substrate 126.

For example, a process for stacking the upper electrode 112 on the upper substrate 111, a process for stacking the lower electrode 115 on the lower substrate 116, a process for forming the partition wall 114 on one of the substrates on which the electrodes are formed, and a process for combining the upper substrate 111 and the lower substrate 116 may be first carried out. In order to inject the liquid crystal material, interval portions except for an inlet for injection into the first liquid crystal panel 110 are sealed by a sealant. After injection of the first cholesteric liquid crystal material 113, a process for sealing the inlet is carried out.

Next, like the process for injecting the first cholesteric liquid crystal material 113 into the first liquid crystal panel 110, the second cholesteric liquid crystal material 123 for reflecting the light of the second color is injected (S620).

The third cholesteric liquid crystal material 133 for reflecting the light of the third color is injected into the third liquid crystal panel 130 (S630).

Next, the first double-sided adhesive buffer layer 140 is inserted between the first liquid crystal panel 110 and the second liquid crystal panel 120 to combine the second liquid crystal panel 120 to the lower portion of the first liquid crystal panel 110 (S640).

The second double-sided adhesive buffer layer 150 is inserted between the second liquid crystal panel 120 and the third liquid crystal panel 130 to combine the third liquid crystal panel 130 to the lower portion of the second liquid crystal panel 120 (S650).

After carrying out a process for injecting the first cholesteric liquid crystal material into the first liquid crystal panel 110, a process for injecting the second cholesteric liquid crystal material 123 into the second liquid crystal panel 120, and a process for injecting the third cholesteric liquid crystal material 133 into the third liquid crystal panel 130, the first liquid crystal panel 110 and the second liquid crystal panel 120 are combined to each other, and the second liquid crystal panel 120 and the third liquid crystal panel 130 are combined to each other. However, this sequence is not limited thereto.

A process for combining the light absorption layer 160 to the lower portion of the third liquid crystal panel 130 may be added (S660). The process for combining the light absorption layer 160 to the third liquid crystal panel 130 may be carried out prior to the process for combining the second liquid crystal panel 120 and the third liquid crystal panel 130 or the process for combining the first liquid crystal panel 110 and the second liquid crystal panel 120.

The above description of the illustrative embodiments is provided for the purpose of illustration, and it would be understood by those skilled in the art that various changes and modifications may be made without changing technical conception and essential features of the illustrative embodiments. Thus, it is clear that the above-described illustrative embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the illustrative embodiments. It shall be understood that all modifications and embodiments conceived from the meaning and scope of the claims and their equivalents are included in the scope of the inventive concept.

What is claimed is:

1. A cholesteric liquid crystal display device comprising:
   a first liquid crystal panel containing a first cholesteric liquid crystal material for reflecting a light of a first color;
   a second liquid crystal panel containing a second cholesteric liquid crystal material for reflecting a light of a second color;
   a third liquid crystal panel containing a third cholesteric liquid crystal material for reflecting a light of a third color;
   a light absorption layer combined to a lower portion of the third liquid crystal panel;
   a first double-sided adhesive buffer layer positioned between the first liquid crystal panel and the second liquid crystal panel to combine the second liquid crystal panel to a lower portion of the first liquid crystal panel; and
   a second double-sided adhesive buffer layer positioned between the second liquid crystal panel and the third liquid crystal panel to combine the third liquid crystal panel to a lower portion of the second liquid crystal panel,
   wherein the first double-sided adhesive buffer layer and the second double-sided adhesive buffer layer comprise a film, a first adhesive layer positioned on a top surface of the film, and a second adhesive layer positioned on a lower surface of the film, and
   the first adhesive layer and the second adhesive layer have different adhesive strengths.

2. The cholesteric liquid crystal display device of claim 1, wherein each of the first liquid crystal panel, the second liquid crystal panel, and the third liquid crystal panel comprises:
   a first substrate;
   a first electrode and a second electrode, which are combined to a lower portion of the first substrate and arranged facing to each other; and
   a second substrate combined to a lower portion of the second electrode,
   each of the substrates and the electrodes is transparent, and the cholesteric liquid crystal material is filled between the first electrode and the second electrode.

3. The cholesteric liquid crystal display device of claim 2, wherein the first double-sided adhesive buffer layer and the second double-sided adhesive buffer layer are transparent and have the same refractive index as a refractive index of the first substrate and the second substrate.

4. The cholesteric liquid crystal display device of claim 1, wherein the adhesive layer in contact with the liquid crystal panel having a large bending radius has a relatively smaller adhesive strength.

5. A reflective liquid crystal display device comprising:
   a plurality of liquid crystal panels containing a liquid crystal material for reflecting a light;
   at least one double-sided adhesive buffer layer positioned among the plurality of liquid crystal panels and comprising a film, a first adhesive layer positioned on a top surface of the film, and a second adhesive layer positioned on a lower surface of the film; and
   a light absorption layer combined to a lower portion of a liquid crystal panel positioned undermost among the plurality of liquid crystal panels;
   wherein the plurality of liquid crystal panels comprise liquid crystal materials for reflecting lights of different colors respectively, and the liquid crystal material reflects a light when the liquid crystal material has a plannar texture and allows a light to penetrate therethrough when the liquid crystal material has a focal conic texture;
   the first adhesive layer and the second adhesive layer have different adhesive strengths.

6. The reflective liquid crystal display device of claim 5, wherein the plurality of liquid crystal panels comprise a first liquid crystal panel and a second liquid crystal panel combined to a lower portion of the first liquid crystal panel,
   the first liquid crystal panel contains a first liquid crystal material for reflecting a light of a first color,
   the second liquid crystal panel contains a second liquid crystal material for reflecting a light of a second color and a third liquid crystal material for reflecting a light of a third color, while separately arranging the liquid crystal materials, and
   the double-sided adhesive buffer layer is positioned between the first liquid crystal panel and the second liquid crystal panel.

7. The reflective liquid crystal display device of claim 6, wherein the first liquid crystal panel comprises:
   a first substrate;
   a first electrode and a second electrode, which are combined to a lower portion of the first substrate and arranged facing to each other; and
   a second substrate combined to a lower portion of the second electrode,
   each of the substrates and the electrodes is transparent, and the first liquid crystal material is filled between the first electrode and the second electrode.

8. The reflective liquid crystal display device of claim 6, wherein the second liquid crystal panel comprises:
a first substrate;
a first electrode and a second electrode, which are combined to the lower portion of the first electrode and arranged facing to each other;
at least one partition wall positioned between the first electrode and the second electrode to partition the second liquid crystal material and the third liquid crystal material; and
a second substrate combined to the lower portion of the second electrode,
each of the substrates and the electrodes is transparent, and
liquid crystal materials for reflecting lights of different colors are filled in neighbored spaces among spaces partitioned by the partition wall.

9. The reflective liquid crystal display device of claim 8, wherein the double-sided adhesive buffer layer is transparent and has the same refractive index as a refractive index of the first substrate and the second substrate.

10. The reflective liquid crystal display device of claim 5, wherein the adhesive layer in contact with the liquid crystal panel having a large bending radius has a relatively smaller adhesive strength.

11. The reflective liquid crystal display device of claim 5, wherein the plurality of liquid crystal panels comprise a first liquid crystal panel and a second liquid crystal panel combined to a lower portion of the first liquid crystal panel,
the first liquid crystal panel contains a first liquid crystal material for reflecting a light of a first color and a second liquid crystal material for reflecting a light of a second color, while separately arranging the liquid crystal materials,
the second liquid crystal panel contains a third liquid crystal material for reflecting a light of a third color, and
the double-sided adhesive buffer layer is positioned between the first liquid crystal panel and the second liquid crystal panel.

12. The reflective liquid crystal display device of claim 11, wherein the first liquid crystal panel comprises:
a first substrate;
a first electrode and a second electrode, which are combined to a lower portion of the first substrate and arranged facing to each other;
at least one partition wall positioned between the first electrode and the second electrode to partition the first liquid crystal material and the second liquid crystal material; and
a second substrate combined to a lower portion of the second electrode,
each of the substrates and the electrodes is transparent, and
liquid crystal materials for reflecting lights of different colors are filled in neighbored spaces among spaces partitioned by the partition wall.

13. The reflective liquid crystal display device of claim 11, wherein the second liquid crystal panel comprises:
a first substrate;
a first electrode and a second electrode, which are combined to the lower portion of the first substrate and arranged facing to each other; and
a second substrate combined to the lower portion of the second electrode,
each of the substrates and the electrodes is transparent, and
a third liquid crystal material is filled between the first electrode and the second electrode.

14. The reflective liquid crystal display device of claim 12 or 13,
wherein the double-sided adhesive buffer layer is transparent and has the same refractive index as a refractive index of the first substrate and the second substrate.

15. A method for manufacturing a cholesteric liquid crystal display device, the method comprising:
(a) inserting a first double-sided adhesive buffer layer between a first liquid crystal panel containing a first cholesteric liquid crystal material for reflecting a light of a first color and a second liquid crystal panel containing a second cholesteric liquid crystal material for reflecting a light of a second color to combine the second liquid crystal panel to a lower portion of the first liquid crystal panel; and
(b) inserting a second double-sided adhesive buffer layer between the second liquid crystal panel and a third liquid crystal panel containing a third cholesteric liquid crystal material for reflecting a light of a third color to combine the third liquid crystal panel to a lower portion of the second liquid crystal panel;
wherein the first double-sided adhesive buffer layer and the second double-sided adhesive buffer layer comprise a film; a first adhesive layer positioned on a top portion of the film; and a second adhesive layer positioned on a lower portion of the film, and
the first adhesive layer and the second adhesive layer have different adhesive strengths.

16. The method for manufacturing a cholesteric liquid crystal display device of claim 15,
wherein the method further comprises combining a light absorption layer to a lower portion of the third liquid crystal panel.

* * * * *